US007457989B2

(12) United States Patent
Ulrich et al.

(10) Patent No.: US 7,457,989 B2
(45) Date of Patent: Nov. 25, 2008

(54) SYSTEM AND METHOD FOR SELECTING TEST CASE EXECUTION BEHAVIORS FOR REPRODUCIBLE TEST AUTOMATION

(75) Inventors: Adam M. Ulrich, Kent, WA (US); Michael D. Gallacher, Bothell, WA (US); Michael J. Hunter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 10/953,238

(22) Filed: Sep. 29, 2004

(65) Prior Publication Data

US 2006/0075302 A1 Apr. 6, 2006

(51) Int. Cl.
*G06F 11/00* (2006.01)
(52) U.S. Cl. .......................................... 714/38; 717/124
(58) Field of Classification Search .................. 714/38, 714/37, 39; 717/124, 127, 128
See application file for complete search history.

(56) References Cited

U.S. PATENT DOCUMENTS

| 5,335,342 | A | * | 8/1994 | Pope et al. ..................... 714/38 |
| 5,513,315 | A | | 4/1996 | Tierney et al. .......... 395/183.13 |
| 6,067,639 | A | * | 5/2000 | Rodrigues et al. ............. 714/38 |
| 6,505,324 | B1 | * | 1/2003 | Cowan et al. .................. 716/4 |
| 7,117,411 | B2 | * | 10/2006 | McNeely et al. ............. 714/724 |
| 7,159,021 | B2 | * | 1/2007 | Boldman et al. ............. 709/223 |
| 7,165,191 | B1 | * | 1/2007 | Vakrat .......................... 714/38 |
| 2003/0070120 | A1 | | 4/2003 | Michael et al. ................ 714/38 |
| 2003/0084429 | A1 | | 5/2003 | Schaefer ...................... 717/125 |
| 2003/0131290 | A1 | | 7/2003 | Weinberg et al. ............. 714/46 |
| 2003/0164854 | A1 | | 9/2003 | Polk ........................... 345/762 |

OTHER PUBLICATIONS

Allott, S.K., "Automate Your Tests-You Won't Regress It!", *Seventeenth Annual Pacific Northwest Software Quality Conference*, Oct. 12-13, 1999, 135-157.
Chang, L. et al., "Using Application States in Software Testing", *International Conference on Software Engineering*, 2000, 776.
Dooley, .W., "Test Automation, A Cost Effective and Reliable Alternative to Labor", *Proceedings of the Technical Program, SMTA International*, Sep. 30-Oct. 4, 2001, 105-108.
Fecko, M.A. et al., "Lessons Learned from Automating Tests for an Operations Support System", *Software-Practice and Experience*, 2002, 32, 1485-1506.
Gascoyne, S., "Productivity Improvements in Software Testing with Test Automation", *Electronic Engineering*, 2000, 65-66.

(Continued)

*Primary Examiner*—Dieu-Minh Le
(74) *Attorney, Agent, or Firm*—Woodcock Washburn LLP

(57) ABSTRACT

A system and method for separating execution behaviors from test cases and consolidating execution behaviors in an execution behavior manager comprising or in communication with an execution behavior library. The method includes selecting an execution behavior for executing a step or action in a test case and sending the execution behavior to the test case for execution. Additionally, the system and method provide for applying global and local weightings to the execution behavior selection process and allow for replaying a test case with previously executed behaviors.

31 Claims, 6 Drawing Sheets

OTHER PUBLICATIONS

Giaccone, F. et al., "Test and Debug of Device/Process Control Code", *IBM Technical Disclosure Bulletin*, 1976, 609-611.

Hirt, E., "Protest", *Proceedings of the 4th Conference on Quality Engineering in Software Technology and VDE-ITG Workshop on Testing Non-Functional Software-Requirements*, Sep. 13-15, 2000, Nuremberg, Germany, 278-289.

Martin, C.E. et al., "Test Development and Test Automation for the PacketStar® PSAX Product", *Bell Labs Technical Journal*, 2002, 7(1), 183-195.

Magalhaes, G.R. et al., "A tool for Test Automation with Support for Remote Tests", *Midwest Symposium on Circuits & Systems*, 2000, 343-346.

Pfifferling, F., "Test Automation: Benefits and Pitfalls", *IEEE Intercon Technical Program Papers*, 1973, 7(8), 3 pages.

Sabbatini, E. et al., "Automating Test by Adding Formal Specification: An Experience for Database Bound Applications", *Advances in Engineering Software*, 1999, 30, 885-890.

\* cited by examiner

SYSTEM AND METHOD FOR SELECTING TEST CASE EXECUTION BEHAVIORS FOR REPRODUCIBLE TEST AUTOMATION

CROSS-REFERENCE TO RELATED APPLICATIONS

This application is related to U.S. patent application Ser. No. 10/953,437, entitled "Automated Test Case Verification That Is Loosely Coupled With Respect To Automated Test Case Execution", filed herewith and U.S. patent application Ser. No. 10/953,402, entitled "Test Automation Stack Layering", filed herewith.

FIELD OF THE INVENTION

The invention relates to testing software for applications and in particular to extraction of execution behaviors from test cases.

BACKGROUND OF THE INVENTION

The major stages in the life cycle of software development are the design phase, the coding phase, the code complete phase, the alpha phase, the beta phase, and finally, release to market. During the design phase, the customer problems the software product will address and the functionality of the software product is defined. Typically, the completion of the functional specification marks the end of the design phase. The coding phase may already have begun. The code complete phase is reached when the code has been written but is not necessarily debugged. The alpha phase marks the point in time when the product is stable; that is, most of the major bugs have been found. In the beta phase, the product is ideally free of all major bugs; the only bugs remaining should be essentially harmless. When the product passes a final quality assurance checklist, it is ready for release to market.

As no one wants software that does not work, testing is an important part of the life cycle and can span several phases. Software testing involves devising a test case (or, more likely, a set of test cases), running the software with the test case as input, and checking that the performance of the software with the test case as input yields the expected results. Software testing can be conducted manually by humans or programmatically, referred to as automated software testing. Ideally, testing of the software should begin as soon as possible in the life cycle of the software. Generally, however, the software cannot be tested at all until the design phase has been completed, because until the design phase is complete, expected results cannot be determined. Typically, during the coding phase, the developer manually tests his code as he writes it. Automated software testing usually cannot begin until far later in the development process.

Sometimes, the only testing that is conducted is done by the developer who manually tests as he codes. A developer who tests his own work, however, is likely to overlook bugs that someone not so emotionally invested in the code will find. Furthermore, the scope of the developer's testing is typically limited to the functionality of his code and integration of his code with a limited number of other software applications.

To address these shortcomings, many software development houses have a separate software testing group that also tests the software, often using at least partially-automated testing techniques. Typically, the testing group tests complex interactions across features and across applications by writing and running test cases. It is generally agreed that involving the testing group early in the product life cycle, even as early as the design phase, reaps many benefits, including identification of inconsistencies in the functional specification, identification of hard-to-test areas and others. In general, however, the effort required to keep each test case current in the face of continued changes in feature definition, implementation and user interface (UI) tuning renders this approach impractical. Hence, writing and running test cases is typically a hurried matter that occurs at the tail end of product development. Testing and in particular, automated testing, thus tends to be perpetually behind the curve. It would be helpful if there were a way to write test cases and employ automated testing as soon as possible in the life cycle of a software product, ideally during the design phase.

Development of a suite of test cases is a challenge whenever it occurs. To test a specific feature of an application, numerous sets of tests must be written. For example, an application may permit many modes of interaction with a feature: via a mouse, keyboard, digitizer, accessibility software, programmatically, and so on. Therefore, to provide a comprehensive test for the feature, a suite of tests should include a set of tests interacting with the feature via the mouse (typing text just like a user might); one set interacting with the feature via keyboard, one set interacting with the feature via digitizer, one set interacting with the feature via accessibility software to invoke default actions and otherwise mimic an accessibility application, one set interacting with the feature via the application's coding model, and so on. It would be helpful if there were a way to make sure that the suite of test cases produced provided a comprehensive test of the feature or application and further, to decrease the total number of test cases that must be written to provide that comprehensive test.

Furthermore, much or all of the logic in each of these sets of test is identical to the logic in the other sets of tests and typically, much or all of the verification of results processing is identical as well. Hence, many tests are identical or very nearly so, merely varying execution options. For example, for all the multiple forms of input described above, the expected results are likely identical. Hence, writing a test case for each of these input sources typically requires writing a separate method for executing the test for each of the input sources, and duplicating most of the rest of the test script. Writing the same test over and over again with minor variations is tedious and time-consuming. It would be helpful if there were a way to eliminate or significantly reduce this duplicative coding and to reduce the total number of test cases that must be written.

Code written to determine if the actual results of running the test case coincide with the expected results (called verification of results, or verification) is often included within the test case. Changing the details of a particular result verification or adding new result verification typically requires the modification of each test case. It would be helpful if verification code were separate from the test case, making the test case easier to understand, and the verification code easier to reuse and to maintain.

Execution details are often hard-coded into the test case, requiring the design phase to be complete before the test case is written. It would be helpful if there were a way to define test cases in terms of user actions rather than in terms of specific execution details so that test cases could be written earlier in the software development life cycle.

Testing a software application is a crucial step in the initial development of the application and in the implementation of modifications to the application. Software application developers exert much effort in the testing phase of the application's development. Such testing helps ensure that the application responds in an expected manner to a specific action.

Typically, a test case is coded specifically for testing a component of an application. For example, a user-interface (UI) test case may contain code representing the identification of text boxes, buttons, menus, and the like, whereas an application programming interface (API) test case may communicate directly with an API being tested. Writing a test case for each of these methods of execution may require writing primarily the same test case, with the only variation between the test cases being the manner of execution. That is, one test case may specify testing a component of an application using buttons, another may specify testing the component using an object model, and another using keyboard input. Aside from the execution method, these test cases and the expected results of their implementation may be identical.

Additionally, a test case may require the execution of multiple operations, with each operation capable of being completed using any of a number of execution methods (e.g., invoking buttons or menus with a mouse, invoking buttons or menus with a keyboard, invoking a menu with a mouse and a button with a keyboard, etc.). The number of test cases necessary to test all possible combinations of execution methods for completing multiple operations of an application may be large, even for a relatively simple application.

Developing such a large volume of test cases to test applications by all execution methods is a daunting prospect. Such a task could require writing numerous, virtually identical test cases with variation in only the execution method. Also, test case maintenance can be even more labor-intensive and time-consuming than test case creation. When an application is altered, the applicable test cases may require updating to ensure continued compatibility. Updating such a large number of test cases written for each execution method would likewise be a daunting task.

Additionally, some methods of execution may not be tested at all in a test case. The test case may be designed to determine if an application does a particular action without causing unexpected results. The test case may not be concerned with the method of execution of actions that may seem tangential to the purpose of the test case. It would be advantageous, however, if even the tangential steps of a test case were tested by various execution methods even when the focus of the test may be on some other aspect of the application. If the test case is primarily intended, for example, to test an application's ability to draw a blue rectangle, the test case may include a step for opening a new document. Because opening a new document may be tangential to the purpose of the test case, the test case may provide for the action to be completed using a mouse only. It would be useful, however, to test all execution methods for opening a new document because, for example, it may be discovered that opening a new document using a keyboard causes the blue rectangle to in fact be colored red, created as a circle, or otherwise vary from the expected result.

Therefore, there is a need to test applications using various execution methods without requiring virtually identical test cases to be written for each execution method or every combination of possible execution methods.

SUMMARY OF THE INVENTION

The invention enables a single test case to be executed by many execution methods or combinations of execution methods. These execution methods are called "execution behaviors." The invention enables a single test case to be executed by various execution behaviors without requiring cumbersome, detailed test case code to account for the numerous combinations of execution behaviors.

The invention separates the execution behavior from the test case and leaves the selection of the execution behavior to a separate device called an "execution behavior manager." A test case or a step in a test case may call the execution behavior manager. The execution behavior manager may select an execution behavior and send the execution behavior back for execution by the test case. The execution behavior manager may select an execution behavior based on previous execution behaviors sent for previous calls from the test case. The execution behavior manager may keep track of the execution behaviors previously provided and cycle through all available execution behaviors. This may provide a balance of the testing of the application by all available execution behaviors.

Additionally, "global" weightings may be applied by the execution behavior manager in all decisions regarding selection of an appropriate execution behavior. For example, if menus in an application have been restructured, then a global weighting may be applied, telling the execution behavior manager to use menus 80% of the time and toolbar buttons 20% of the time. This global weighting may override the execution behavior manager's normal operation of selecting each execution behavior an equal number of times.

Additionally, the test case can, through a "local" weighting, override the global weighting and tell the execution behavior manager, for example, to use a toolbar button to execute an "open new document" step of a test case. This override may be important if, for example, the toolbar has recently been restructured and the tester desires to ensure that it works properly in a particular test case. The local weighting alternatively may be used in concert with or orthogonal to the global weighting such that both weightings are taken into account in executing a behavior.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

Separating execution behaviors from test cases and consolidating execution behaviors in an execution behavior manager allows an application to be more thoroughly tested. The invention provides more thorough testing by enabling a single test case to be executed through use of all execution behaviors and combinations of execution behaviors. With separation of the execution behavior from the test case, the execution behavior manager may continue to cycle through all of the various execution behaviors for each step of a test case. In this way, numerous combinations of various execution methods for each step may be tested, providing greater comprehensiveness. The invention may enable detection of a bug from a specific combination of execution methods for each step of a test case, where the bug may have not been noticed previously. Additionally, the invention provides for replaying such a test case with the exact execution behaviors to determine if the bug has been fixed.

Example Computing Environment

Figure 1:
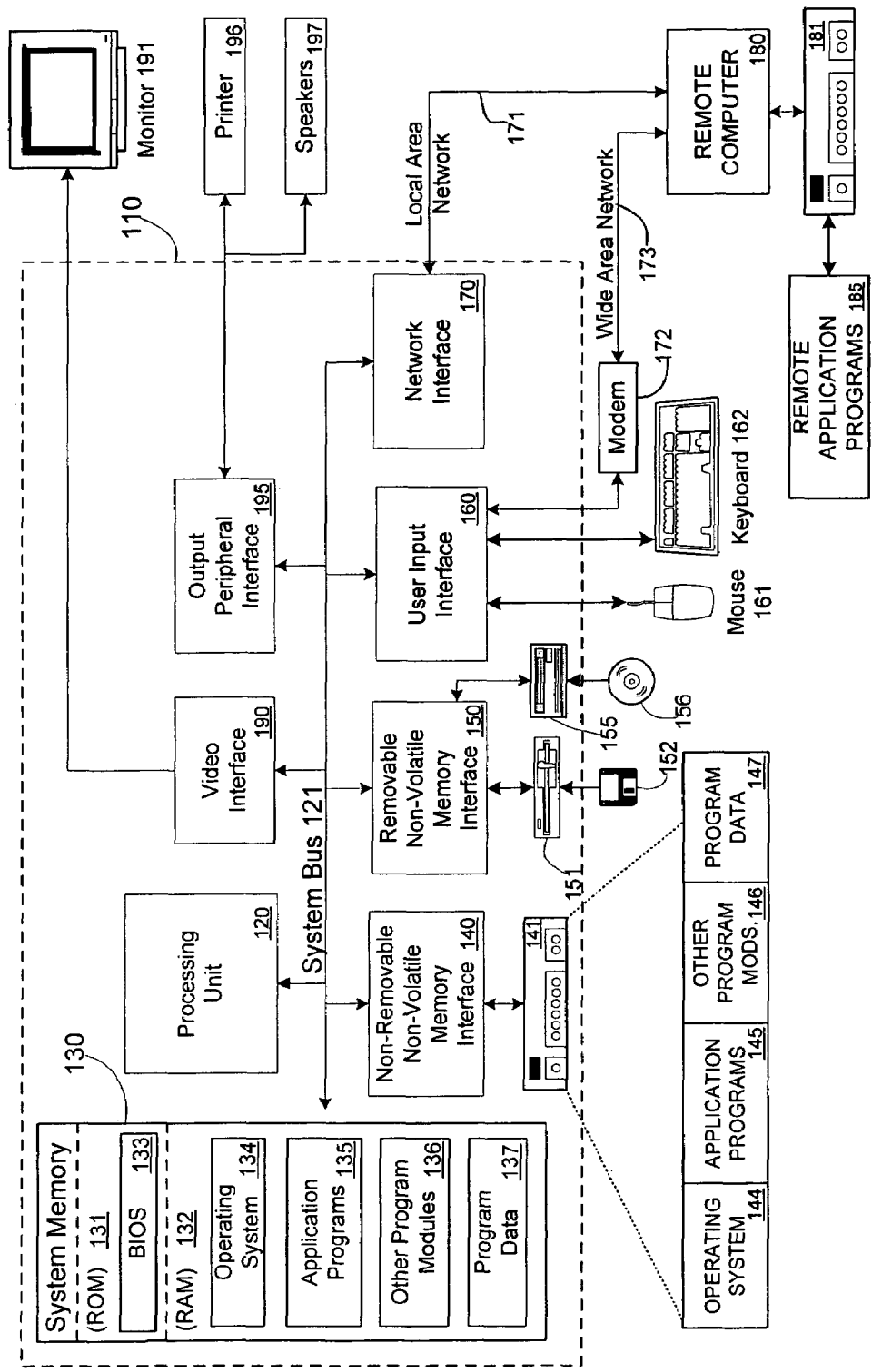
FIG. 1 is a block diagram showing an example computing environment in which aspects of test case implementation with execution behavior extraction from the test case may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Figure 2:
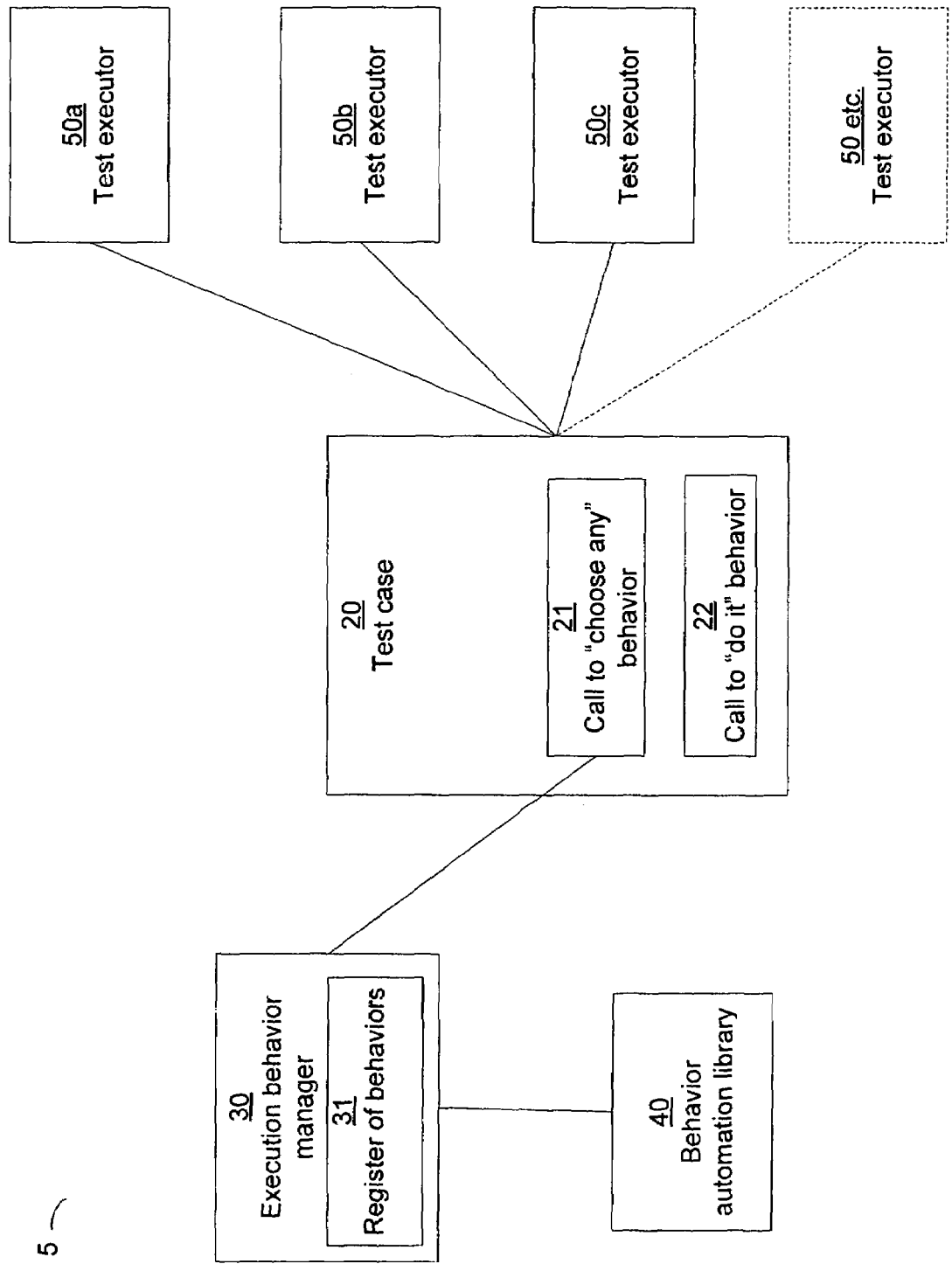
FIG. 2 depicts a block diagram of an example embodiment of a system for test case implementation with execution behavior extraction.

System and Method for Testing Applications Through Execution Behavior Extraction FIG. 2 depicts a block diagram of a system 5 for test case implementation with execution behavior extraction in accordance with one embodiment of the invention. System 5 may include one or more of: a test executor 50, a test case 20, a behavior manager 30, a register 31, and a behavior automation library 40.

The test executor 50 may be one test executor 50a or may be a plurality of test executors 50a-c, etc. The test executors each may reside on one or multiple computers, each of which may be a computer 110 as described with regard to FIG. 1. The test executors 50a may all run the same test case such as test case 20 or may each run different test cases. Additionally, the test executors 50a-c may communicate with one behavior manager 30 or may each communicate with respective behavior managers (not shown). The test executors 50a-c may execute a test case 20 through a user (not shown) pressing a button, for example, on the test executors 50a-c. Alternatively, the test executors 50a-c may be a part of a lab test automation project that invokes a start event to execute the test case 20. The test executors 50a-c may execute a test case 20 by other means as well.

A test case 20 may test one or more components or properties of an application (not shown). The application may be any process, machine, manufacture, composition of matter, program, software, hardware, device, mechanism, or material, or any improvement thereof. For example, the application may be a software program that runs on any computing system or environment. Also for example, the application may be computer hardware. The application may instead be a door testing mechanism where a maul hammers on a doorknob to test the strength, resiliency, or operability of the doorknob and the hinges attached to the door. The application may be under development for the first time, an updated version of a previous application, a previously-released application that an end user has modified in some way, and the like.

The test case 20 may perform functional, integration, or other testing of an application. Functional testing may include the testing of a particular functional component of an application. At the functional level, the component may contain numerous behaviors, each of which may require testing. Additionally, each combination of execution behaviors for the components may require testing to ensure testing across all potential combinations and coverage of all different possibilities. Integration testing tests the manner in which two or more interacting components combine, work together, and affect each other.

The test case 20 may encompass or require the execution of one or a plurality of execution behaviors. An "execution behavior" is a description of an action to be performed on or by an application. The execution behavior may be, for example, "open a new document" or "draw a blue rectangle" or "hit a doorknob with a maul." There may be different types of execution behaviors.

One type of execution behavior may have only one possible method of execution. For example, such an execution behavior may require an application to invoke a button on a text box by pressing the space bar on the keyboard. Because the behavior may only be executed in one manner, this execution behavior may be labeled as a "do it" behavior. A "do it" behavior may be executed without requiring any additional information or action prior to execution. A "do it" behavior is included in the system 5 as a "do it" behavior of the test case 20.

An execution behavior may be a parent execution behavior composed of other, child, execution behaviors. Because the parent execution behavior may be composed of a plurality of child execution behaviors from which to choose, such a parent execution behavior may be called a "choose any" behavior. This parent execution behavior may be a "choose any" behavior and may be executed using alternative execution behaviors.

The test case 20 may include a call to a "choose any" behavior 21 that requests the execution behavior manager to select a behavior from the behavior automation library 40. The test case 20 may also include a call to a "do it" behavior 22 that initiates the execution of a "do it" behavior stored in the behavior automation library 40.

Figure 3:
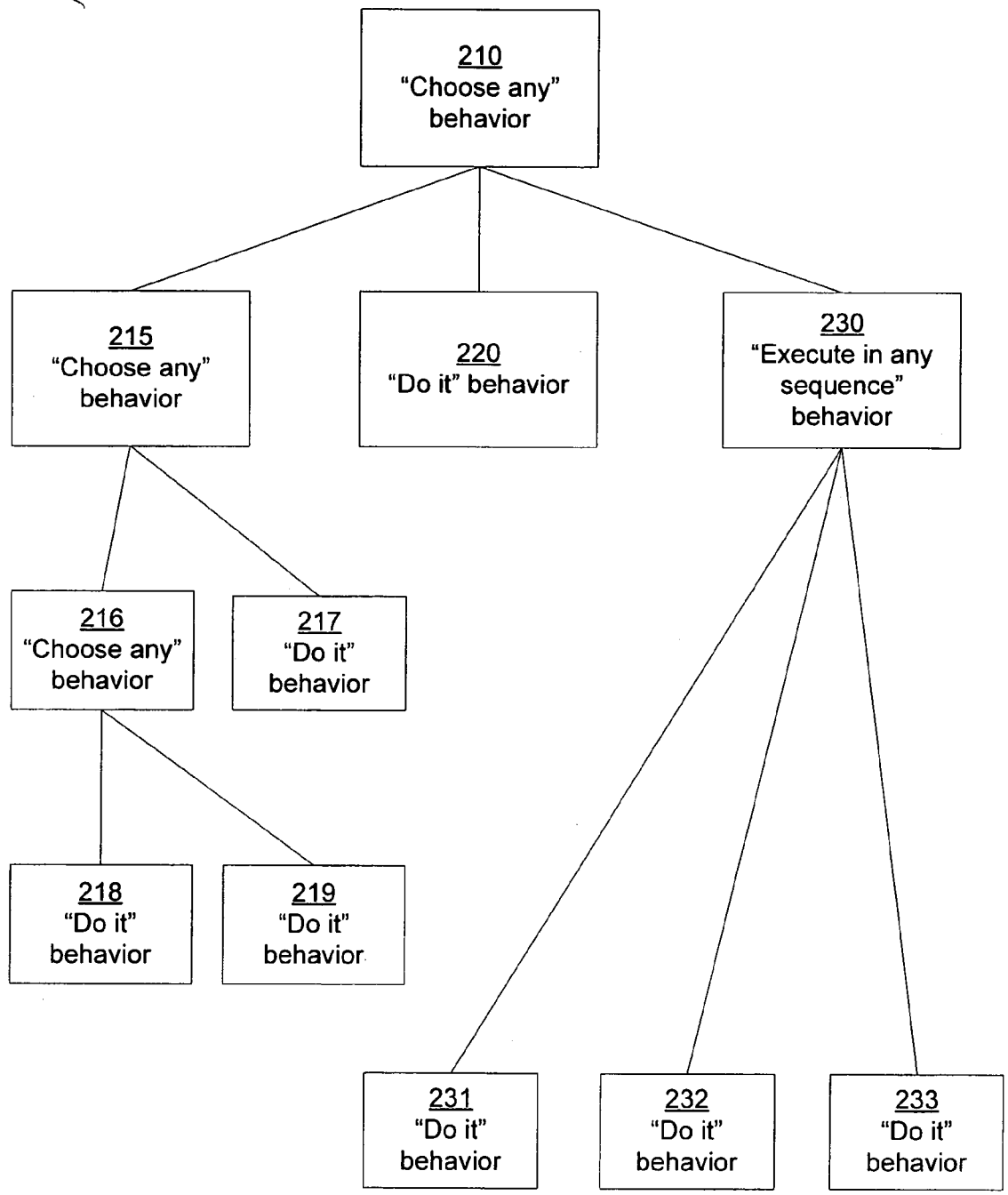
FIG. 3 depicts a block diagram of example execution behaviors.

FIG. 3 is a block diagram 200 depicting a few example execution behaviors and showing relationships between example execution behaviors. The "choose any" behavior 210 may be for opening a new document. The "choose any" behavior of opening a new document may be accomplished by any of three child execution behaviors. One child execution behavior of "choose any" behavior 210 may be another "choose any" behavior 215 for opening a new document using a mouse. Another child execution behavior of "choose any" behavior 210 may be the "do it" behavior 220, which may be for opening a new document by invoking a button on a text box by pressing the space bar on a keyboard. The third child behavior of "choose any" behavior 210 may be an "execute in any sequence" behavior 230, which is described below. As discussed below, the execution behavior manager 30 may select one of the child execution behaviors 215, 220, 230 for executing the "choose any" behavior 210.

As mentioned, the first child execution behavior of "choose any" behavior 210 may itself be the "choose any" behavior 215, which may be for opening a new document using a mouse. The "choose any" behavior 215 may be comprised of two child behaviors. One child behavior may be a "do it" behavior 217 for opening a new document using a mouse to click a certain button. If the execution behavior manager 30 selects the "do it" behavior 217, then this behavior is sent back to the "choose any" behavior 210 for execution. Alternatively, the execution behavior manager 30 may look at the other child behavior of "choose any" behavior 215, which may be a "choose any" behavior 216 for opening a new document using a mouse to invoke a menu.

The "choose any" behavior 216 may also comprise two child behaviors. One child behavior may be a "do it" behavior 218 for opening a new document using a mouse to invoke a menu and clicking on a "new file" button on the menu. The second child behavior may be a "do it" behavior 219 for opening a new document using a mouse to invoke a menu and using keyboard "hot keys" or mnemonic shortcuts that directly invoke the applicable menu item. The hot keys may invoke a "new file" button on the menu. The "do it" behavior 219 may therefore be a "great grand child" of the "choose any" behavior 210 and may be the "do it" behavior selected to execute the "choose any" behavior 210.

There also may be other execution behaviors in addition to the "do it" and "choose any" behaviors. There may be an "execute in any sequence" behavior 230 which may require selection of all child behaviors for execution in any sequence. For example, if the "execute in any sequence" behavior comprises three child behaviors, a "do it" behavior 231, a "do it" behavior 232, and a "do it" behavior 233, the execution behavior manager 30 may send each child "do it" behavior 231, 232, 233 to the "choose any" behavior 210, in any order for execution.

Additionally, there may be other execution behaviors not shown in FIG. 3. There may be an "execute in sequence" behavior which may require selection of child behaviors for execution in a required order. There may be a "do until" behavior which may require an execution of one or more execution behaviors until some condition is met. For example, a "do until" behavior may require a child behavior to be executed until it has been executed twenty times. It should be understood that the execution behaviors described herein are examples of execution behaviors, and those skilled in the art will recognize that there may be other execution behaviors used in embodiments of the invention.

Each execution behavior may contain attributes or properties. These attributes or properties may be written in, for example, a C# or .NET attribute mechanism. The mechanism may apply various properties to the execution behavior including the execution method for the execution behavior. For example, one property may specify that the execution behavior be executed using a mouse while another property may specify execution using a keyboard.

Execution behaviors may not "know" they are a part of a larger, parent behavior such as a "choose any" behavior. Execution behaviors, however, may "know" their child behaviors. This too may be defined by, for example, C# or NET attributes. That is, an attribute may be assigned to an execution behavior which labels it as a, for example, "choose-any" behavior. The attribute may also provide the "choose any" behavior with its child behaviors.

Referring back to FIG. 2, as described above, a test case 20 may comprise a plurality of execution behaviors. For example, a test case 20 for a graphics application may call for the drawing of a blue rectangle at a particular location on a document. Such a test case 20 may comprise the steps of opening a new document, drawing a rectangle in a particular location, and coloring the rectangle blue. Each step of the test case may be a "choose any" behavior 21, a "do it" behavior 22, or any other type of execution behavior. For example, the step of opening a new document may be a "choose any" behavior 21 containing "do it" behaviors such as opening a new document using a mouse to invoke a menu, or opening a new document using a mouse to invoke a tool on a toolbar, or opening a new document using a keyboard to invoke a menu. The steps of drawing and coloring a rectangle may each be a "choose any" behavior 21, requiring invoking a project panel or menus by various child "do it" behaviors. The menus may be invoked, for example, by using a mouse, a keyboard, an object, or an accessibility application programming interface for users who have difficulty, for example, seeing a computer screen. The keyboard may be used to issue "hot keys" or arrow keys to navigate around the menus.

Upon execution of a test case 20, if a step comprises a "do it" behavior 22, then the test case 20 may execute the behavior. A test case may contain a "do it" behavior step if, for example, there is only one execution method for completing the step. For example, the step may require a button to be invoked by pressing the "enter" key on the keyboard. Because there is only one way of executing this behavior, the test case 20 may execute this "do it" behavior without calling the execution behavior manager.

If, however, a step comprises, for example, a "choose any" behavior 21, then the execution behavior manager 30 may select a child execution behavior of the "choose any" behavior 21 and send the selected behavior to the parent "choose any" behavior 21 for execution.

The execution behavior manager 30 may reside on a computer 110 as described with regard to FIG. 1. The execution behavior manager 30 may contain a register of execution behaviors 31. The register of execution behaviors 31 may comprise listings of parent execution behaviors, such as the "choose any" behavior 21, and the related child behaviors. With the register 31, the execution behavior manager 30 may determine which child behavior or behaviors belong to the parent "choose any" behavior 21, for example.

Each execution behavior or coding for each execution behavior may be located in a behavior automated library 40 in communication with the execution behavior manager 30. The execution behavior manager 30 may be responsible for handling requests from the "choose any" behavior 21 of the test case 20 for selection of a child behavior for execution.

As noted, upon execution of a test case 20 containing a "choose any" behavior 21, for example, the "choose any" behavior 21 may call out to the execution behavior manager 30 for the execution behavior manager 30 to select and send back to the "choose any" behavior 21 a child (or grandchild, etc.) "do it" behavior. The behavior manager may look through a list of child behaviors associated with the parent "choose any" execution behavior and select one of the child execution behaviors. In completing this operation, the execution behavior manager 31 may use, for example, a reflection method. A reflection method may include a method enabling dynamic programming and involve programmatically looking at attributes of objects, such as execution behaviors. Through this method, the execution behavior manager 30 may look at an object such as an execution behavior and determine its name, the methods that the execution behavior supports, and its properties or attributes. The execution behavior manager 30 may then determine the properties or attributes of child execution behaviors of the, for example, "choose any" behavior 21, and select a child behavior for execution (assuming the child is a "do it" behavior). Through the use of the reflection method, the child behavior may be instantiated and passed back to the "choose any" behavior 21 for execution. If the child execution behavior itself is also a "choose any" behavior, then the sequence is repeated until a "do it" behavior related to "choose any" behavior 21 is selected. Alternatively, if the register is a database or other data store, the reflection method may not be necessary to execute an execution behavior if the register is initialized with a set of function pointers. Additionally, those skilled in the art will recognize that the register may be fully initialized prior to test case execution rather than demand-initialized during test case execution.

The execution behavior manager 30 may select a child execution behavior that is the next in line to be executed for the "choose any" behavior 21. For example, the first time a test case 20 containing the "choose any" behavior 21 is run, the execution behavior manager 30 may select a "do it" behavior requiring, for example, use of a mouse to invoke a menu to open a new document. When the test case 20 is run again, the execution behavior manager 30 may next select a "do it" behavior requiring a new document to be opened using keyboard hot keys. In this way the execution behavior manager 30 may automatically alternate the execution method for the parent "choose any" behavior 21 without the test case 20 specifying the execution method. This extraction of the execution behavior from the test case 20 allows for testing each execution method an equal amount without requiring a different test case 20 to be written to account for the different methods of executing the test case 20. Various other selection algorithms can of course be imagined as well.

It should be noted that child execution behaviors may not always be enabled and available for selection by the execution behavior manager 30 even if the parent is a "choose any" behavior 21 in the test case 20. For example, there may be five different child "do it" behaviors for the "choose any" behavior 21 of drawing a rectangle. One of the child "do it" behaviors may be for drawing a rectangle free hand with a mouse. If the test case 20 requires the drawing of a rectangle of an exact dimension, the child "do it" behavior for drawing the rectangle freehand may not be enabled if the execution behavior manager 30, in looking at the properties or attributes of the behaviors, determines that the child execution behavior is not designed for drawing a rectangle of an exact dimension. The execution behavior manager, therefore, may determine which "do it" behaviors should not be enabled by looking at the attributes or properties of the execution behavior. Alternately, the execution behavior manager 30 may determine which execution behaviors should not be enabled by instantiating the "do it" behavior and then determining if the child execution behavior is capable of, to continue the example, drawing a rectangle of an exact dimension. Alternatively, the execution behavior manager could inspect attributes attached to the child behavior, or look up elsewhere, to find a method to use to determine whether the behavior is enabled.

Separately, global weight factors may be provided to the execution behavior manager 30 such that the execution behavior manager 30 may select one child "do it" behavior more often than or to the exclusion of other child "do it" behaviors. The execution behavior manager 30 may decide which behaviors to send to the "choose any" behavior 21 of the test case 20 based on weights associated with each behavior. The execution behavior manager may construct an entire matrix of actions to be performed based on these weight considerations. In this way, a tester can test certain execution behaviors more often than other execution behaviors for all test cases, if desired. This weighting may be useful, for example, if keyboard operations have been modified in an application. While a "choose any" behavior may have child "do it" behaviors directed to mouse input and keyboard input, a global weighting may be applied such that the execution behavior manager selects child behaviors that call for keyboard input 80% of the time, 100% of the time or 96.3% of the time, for example. In this way, the keyboard input may be more thoroughly tested than if no weightings were applied. Additionally, if hot keys, for example, are not working in an application, a global weighting may be applied, telling the execution behavior manager 30 to never use hot keys for any test case. In this way, test cases may be executed without resulting in failures caused by the defunct hot keys.

Local weightings may be used to override global weightings. Local weightings may be included as part of the test case 20 and may apply to specific behaviors rather than to all behaviors in the behavior automation library 40. For example, if a global weighting precludes using hot keys, and the tester desires to use hot keys during one step of a test case, then the local weighting may used within the test case 20, telling the execution behavior manager 30 to select a child "do it" behavior that includes the use of hot keys. In this way, the local weighting overrides any applicable global weighting.

In an alternative embodiment of the invention, the execution behavior manager 30 may enable "replayability" of test case 20 execution. In this way, regression testing—testing an application in the same way that resulted in a failure or bug previously to determine if the problem has been fixed—may be performed. The execution behavior manager 30 may remember or record the execution behaviors that were executed during a test case 20. In this way, when called, the execution behavior manager 30 may be able to replay the test case 20 exactly as it previously was executed. If a test case resulted in a failure, and a change was made to fix the problem, the tester may want to perform regression testing to ensure that the problem has been resolved. To ensure that the problem has been resolved, the "choose any" behavior 21 of the test case 20 may need to be executed using the same child "do it" behaviors sent by the execution behavior manager 30 during the test case run that resulted in the failure. The execution behavior manager 30, therefore, may record each "do it" behavior that it sent for execution during the earlier test case execution and also record the order in which the "do it" behaviors were executed.

Additionally, it should be noted that the execution behavior manager 30 may work across multiple test cases running on multiple client machines. For example, in testing an application, there could be, at one time, twenty computers each running 5000 test cases on the application. In one embodiment of the invention, there may be one execution behavior manager in communication with all client machines that are executing test cases. In an alternative embodiment, each client machine may include an execution behavior manager 30.

Figure 4:
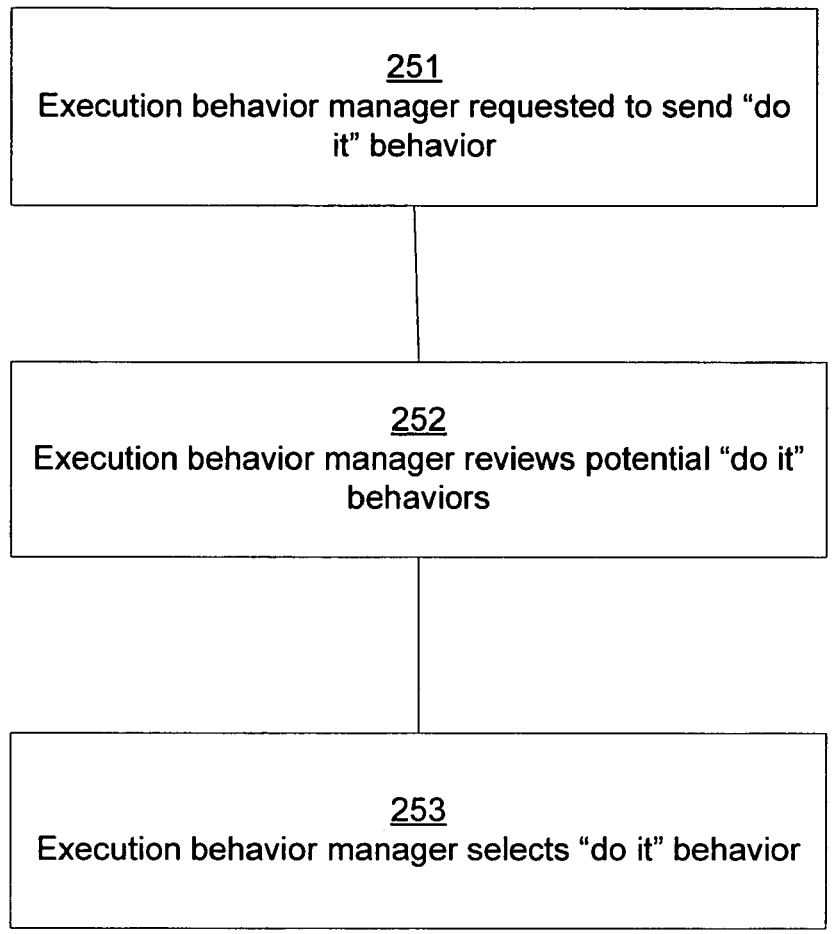
FIG. 4 depicts a flow diagram of a method for test case implementation with execution behavior extraction from the test case.

FIG. 4 depicts a flow diagram of a method 250 for test case implementation with execution behavior extraction from the test case in accordance with one embodiment of the invention. At step 251, the "choose any" behavior 21 of the test case 20 may notify the execution behavior manager 30. The execution behavior manager may be requested to select a child execution behavior, a "do it" behavior, and send the child execution behavior to the "choose any" behavior 21. At step 252, the execution behavior manager 30 may review the child behaviors of the "choose any" behavior 21. At step 253, the execution behavior manager 30 may select a child behavior and send the selected child behavior to the parent "choose any" behavior for execution.

Figure 5A:
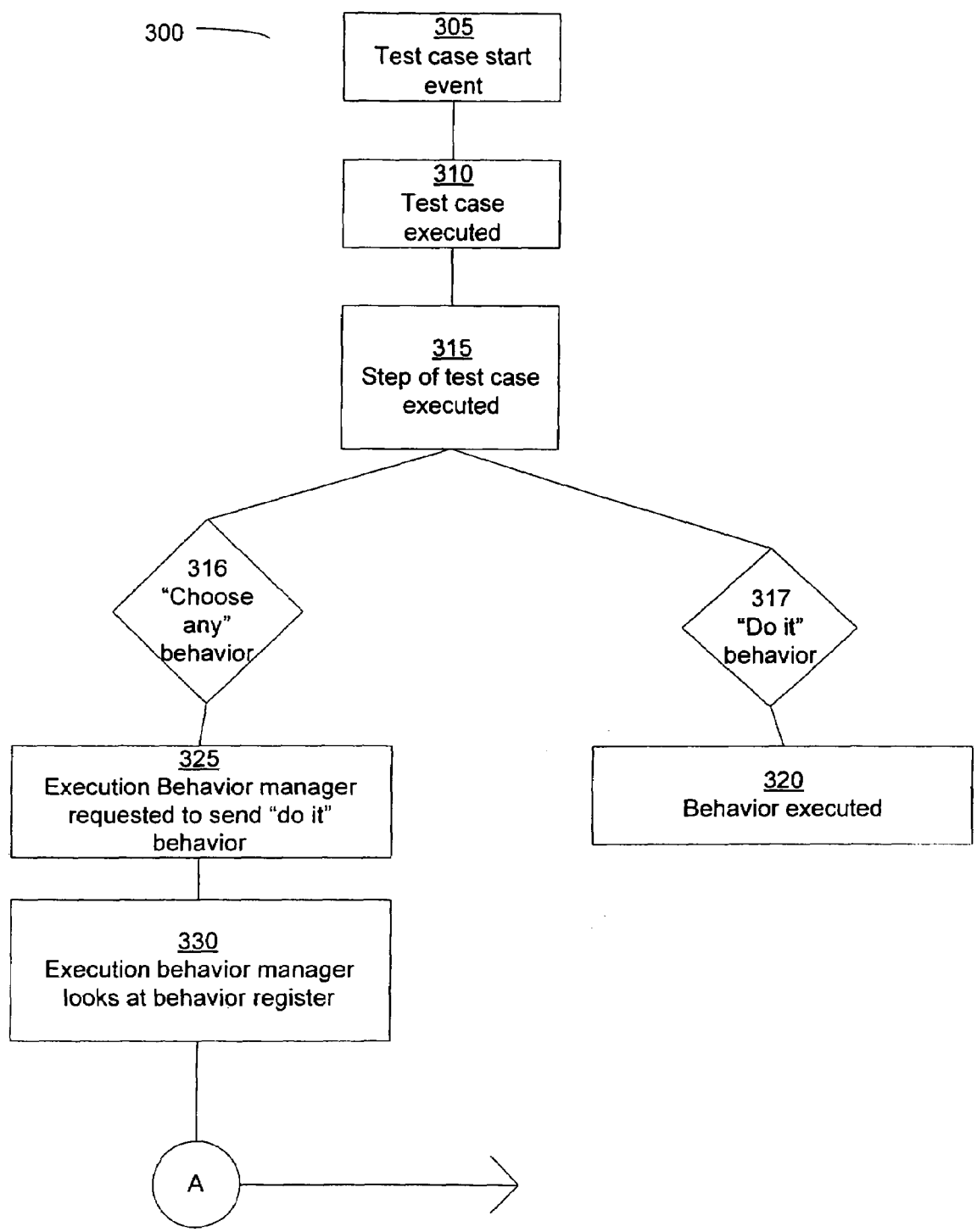
FIGS. 5A-5B depict a flow diagram of an alternative method for test case implementation with execution behavior extraction from the test case.
Figure 5B:
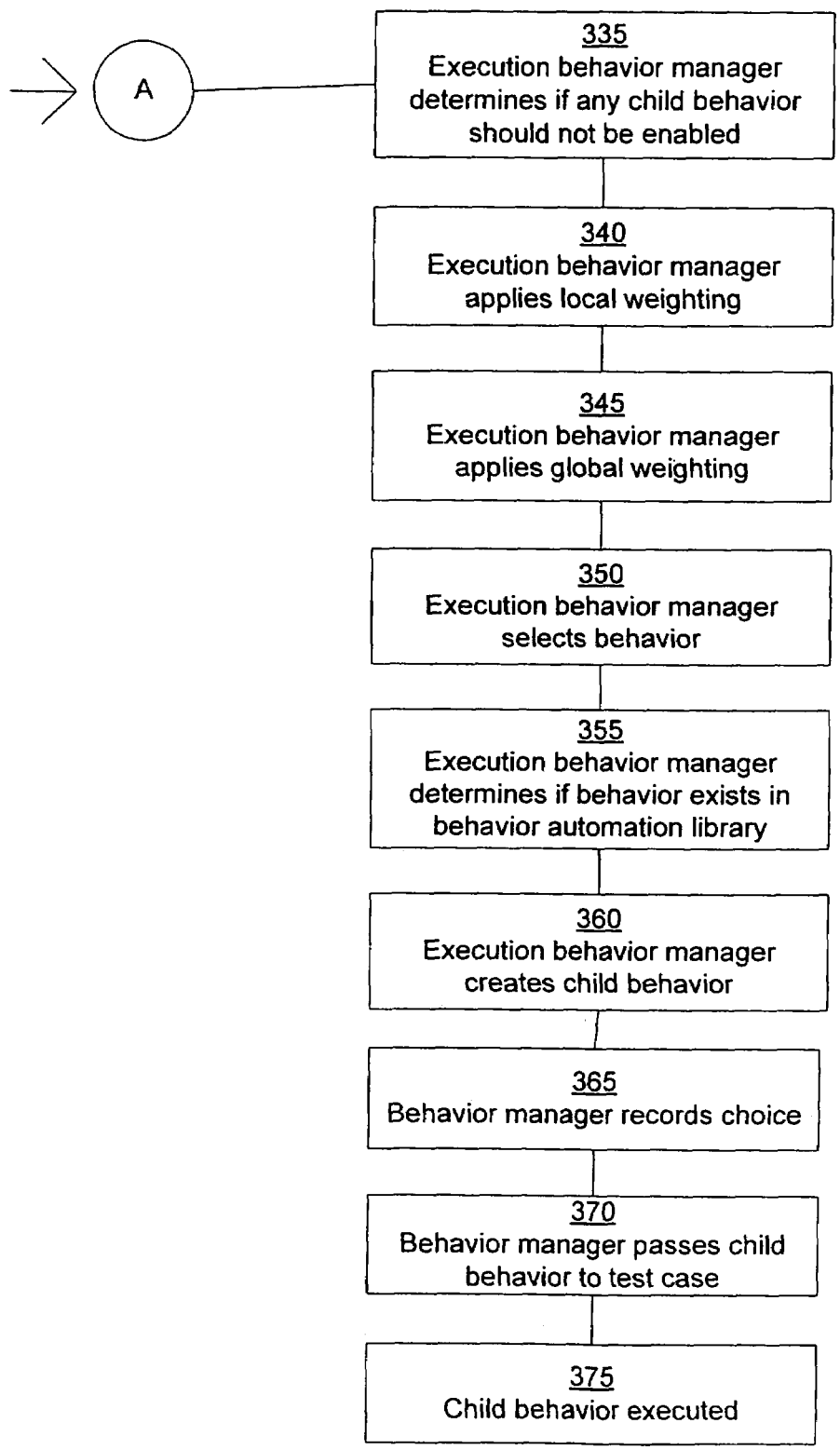

FIGS. 5A-5B depict a flow diagram of a method 300 for test case implementation with execution behavior extraction from the test case in accordance with an alternative embodiment of the invention. The method 300 may begin at step 305 with a test case start event. The start event may be a tester pressing a button on a client computer such as the test executor 50a of FIG. 2, which may signal the test executor 50a to run a test case 20. The start event may alternatively be, for example, running a lab automation process overseeing one or more client computers such as the test executors 50a-c, that run the test case 20 or a plurality of test cases. The lab automation project may also create or initialize the execution behavior manager 30 so that the execution behavior manager 30 is ready to act upon requests from the test case 20 or the plurality of test cases.

After the start event, the test case 20 may be executed at step 310. A test case 20 may be, for example, directed at a graphics application and may include, for example, steps for opening a new document, drawing a rectangle on the new document, and coloring the rectangle blue. The method 300 applied to each step of the test case 20 (i.e., opening a new document, drawing a rectangle, coloring the rectangle blue) is the same. At step 315, a step of the test case is executed.

If a step of the test case 20 is a "do it" behavior 22, then the test case 20 may, at step 320, execute the execution behavior without involving the execution behavior manager 30. If the step is, for example, a "choose any" behavior 21, then the "choose any" behavior 21 may request, at step 325, the execution behavior manager 30 to select a child "do it" behavior for execution. For example, the step of the test case 20 for creating a new document may be a "choose any" behavior with two child "do it" behaviors, one for creating a new document using a mouse to invoke a menu and the other for creating a new document using a keyboard to invoke a menu.

At step 330, the execution behavior manager 30 may search the "choose any" behavior on its register of behaviors 31. In an alternative embodiment, the execution behavior manager 31 may determine the child behaviors of the "choose any" behavior 21 by looking at the attributes or properties of the execution behaviors.

The execution behavior manager 30 may, at steps 335-350, next determine which child behavior should be sent to the "choose any" behavior 21 for execution. The execution behavior manager may consider a number of factors in making the determination. The execution behavior manager may determine, at step 335, if any of the child behaviors should not be enabled. That is, if the step of the test case is such that the "choose any" behavior may not be satisfied through execution of one of the "choose any" behavior's child behaviors, then the execution behavior manager may determine that the child behavior should not be enabled. As explained above, an example of such a situation may be a "choose any" behavior 21 for drawing a rectangle comprising five child "do it" behaviors. One of the child "do it" behaviors may be for drawing a rectangle free hand with a mouse. If the test case 20 requires the drawing of a rectangle of an exact dimension, the child "do it" behavior for drawing the rectangle freehand may not be enabled if the execution behavior manager 30 determines that the child execution behavior is not designed for drawing a rectangle of an exact dimension.

Next, at step 340, the execution behavior manager 30 may determine if the test case 20 or any other mechanism has imposed a local weighting to the selection of a child "do it" behavior. If there is a local weighting, the execution behavior manager may apply that weighting. At step 345, the execution behavior manager 30 may determine if it should apply any global weighting before selecting a child behavior. In the event that a local and a global weighting apply to the same property of an execution behavior, then the execution behavior manager 30 may consider both weightings in selecting a child behavior. For example, a global weighting may require use of a mouse 20% of the time. A local weighting simultaneously may require use of a mouse 50% of the time. The execution behavior manager 30 may combine or consider both of these weightings in choosing a child behavior. Additionally, it should be recognized that global and local weightings may be orthogonal. That is, a global weighting may require that a mouse not be used and a local weighting may require that a keyboard not be used. The execution behavior manager 30 may take the orthogonal weightings into account when choosing a child behavior.

After applying the appropriate weighting(s) or if there are no applicable global weightings, then the execution behavior manager may, at step 350, select a child behavior. This selection may be based on previous selections. For example, if the child behavior selected previously was for opening a new file with a mouse invoking a menu, then the execution behavior manager 30 may choose a different child behavior for opening a new file with a keyboard invoking a menu. In this way, the execution behavior manager 30 may provide for the testing of all execution behaviors without the execution behaviors being written into each test case. Moreover, the test case may not even know which execution method was used to open a new file and may know only that a new file was opened.

If, however, a global weighting is imposed on the execution behavior manager's 30 selection of a child behavior, then the execution behavior manager 30 may apply the weightings in its selection of an appropriate child behavior. For example, if the global weighting provides that execution behaviors using the mouse should be selected 80% of the time and execution behaviors using the keyboard should be selected 20% of the time, then the execution behavior manager 30 should make its selection in conformity with this global weighting.

After determining, at step 350, which child behavior should be selected, the execution behavior manager 30 may then at step 355 look in the behavior automation library 40 to determine if the selected child behavior previously has been created. Alternatively, the execution behavior manager 30 may look in the behavior automation library 40 for a function pointer that, when compiled, may create a child behavior. If the child execution behavior has not been created or if there is no function pointer, then at step 360, the execution behavior manager may create the selected child execution behavior. For example, if, at step 350, the execution behavior manager selects the child behavior for opening a new document using a mouse to invoke a menu, and at step 355, the execution behavior manager determines that the child execution behavior for opening a new document using a mouse to invoke a menu does not exist, then at step 360, the execution behavior manager 30 may create the child behavior. As explained above, the execution behavior manager 30 may create "do it" execution behaviors through use of the profiles or attributes of the execution behaviors and instantiating code stored in the behavior automation library. If at step 355, the execution behavior manager 30 determines that the child behavior exists, then the execution behavior manager may skip step 360. Alternatively, it should be recognized that step 355 may not be necessary. If the register 31 is populated from an external datastore, then step 355 may be necessary. If, however, the register 31 is populated dynamically prior to or during test case execution, then the execution behavior manager 30 may assume that the register 31 does not include any behaviors that do not exist.

After selecting the existing or newly created child behavior, the execution behavior manager 30 next may record the selection of the child behavior at step 365. As explained above, in this way, when desired, the execution behavior manager 30 may be able to re-execute the test case 20 exactly as it previously was executed. This may be important when testing an application to determine if a bug has been eliminated.

At step 370, the execution behavior manager may send the selected child "do it" behavior back to the parent "choose any" behavior 21 of the test case 20 for execution. At step 375, the "choose any" behavior 21 or the test case 20 may execute the behavior sent by the execution behavior manager 30. Additionally, the remaining steps of the test case 20 may also be executed in a similar manner as shown in method 300, steps 315-375.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other embodiments may be used or modifications and additions may be made to the described embodiments for performing the same function of the present invention without deviating therefrom. Throughout the specification, a primary example was provided dealing with a drawing of a blue rectangle. This and any other example were provided to enhance understanding. In no way is the present invention limited to the examples provided herein. Moreover, an embodiment of the present invention may be included in any test involving any application involving any process, machine, manufacture, composition of matter, program, software, hardware, device, mechanism, or material, or any improvement thereof. Therefore, the present invention should not be limited to any single embodiment, but rather should be construed in breadth and scope in accordance with the appended claims.

What is claimed:

1. A computing device having a processor to implement a test case for selecting an execution behavior for executing an action, the selected execution behavior being one of a plurality of child execution behaviors of a parent execution behavior, the parent execution behavior more generally specifying the action to be executed and each child execution behavior of the parent execution behavior more specifically specifying the action to be executed or a portion thereof, the test case comprising:

an execution behavior manager for receiving the more generally specified action from the parent execution behavior; and a behavior automation library for storing each execution behavior therein, the parent execution behavior in the library having data therein regarding each child execution behavior thereof, and for providing the data regarding each child execution behavior of the parent execution behavior to the execution behavior manager upon the execution behavior manager requesting the data after receiving the action from the parent execution behavior, the execution behavior manager based on the provided data from the behavior automation library regarding each child execution behavior of the parent execution behavior selecting at least one of the child execution behaviors such that the more specifically specified action therein is executed.

2. The device of claim 1 further comprising a register of behaviors comprising a listing of a plurality of execution behaviors.

3. The device of claim 2, wherein the execution behavior manager determines potential execution behaviors for executing the action from the register of behaviors.

4. The device of claim 1, wherein the action is executed by one of a plurality of execution behaviors.

5. The device of claim 1, wherein the action is executed by executing a sequence of a plurality of execution behaviors.

6. The device of claim 5, wherein the execution behavior manager executes the sequence in any order.

7. The device of claim 1, wherein the execution behavior manager selects the execution behavior based on at least one of a global weighting and a local weighting.

8. The device of claim 7, wherein the local weighting override the global weighting.

9. The device of claim 1, wherein the execution behavior manager selects the execution behavior based on previously selected execution behaviors.

10. The device of claim 1, wherein the execution behavior manager selects the execution behavior that is enabled.

11. The device of claim 1, wherein the action is at least one of a functional test, a step in a functional test, an integration test, and a step in an integration test.

12. The device of claim 1, wherein the execution behavior manager instantiates the data provided by the behavior automation library to create the selected execution behavior.

13. The device of claim 1, wherein the execution behavior comprises attributes.

14. The device of claim 1, wherein the execution behavior manager records a selected execution behavior.

15. The device of claim 14, wherein the execution behavior manager replays the selected execution behavior.

16. The device of claim 1, wherein the execution behavior comprises an input by at least one of a mouse, a keyboard, an accessibility application programming interface, and an object model.

17. A computer-readable storage medium having stored thereon computer instructions executable by a computer, comprising:
a behavior automation library storing a plurality of execution behaviors therein, including a parent execution behavior and a plurality of child execution behaviors of the parent execution behavior, the parent execution behavior more generally specifying an action to be executed and each child execution behavior of the parent execution behavior more specifically specifying the action to be executed or a portion thereof, the parent execution behavior in the library having data therein regarding each child execution behavior thereof, the library for providing the data regarding each child execution behavior of the parent execution behavior to an execution behavior manager upon the execution behavior manager requesting the data after receiving the action from the parent execution behavior, whereby the execution behavior manager based on the provided data from the library regarding each child execution behavior of the parent execution behavior selects at least one of the child execution behaviors such that the more specifically specified action therein is executed.

18. The computer-readable storage medium of claim 17, further has stored thereon the execution behavior manager.

19. A method implemented on a computing device for selecting an execution behavior for executing an action, the selected execution behavior being one of a plurality of child execution behaviors of a parent execution behavior, the parent execution behavior more generally specifying the action to be executed and each child execution behavior of the parent execution behavior more specifically specifying the action to be executed or a portion thereof, the method comprising:
receiving the more generally specified action from the parent execution behavior;
reviewing data from the parent execution behavior regarding each child execution behavior thereof;
reviewing based on the data each child execution behavior of the parent execution behavior and the more specifically specified action thereof; and
selecting at least one of the child execution behaviors such that the more specifically specified action therein is executed.

20. The method of claim 19, wherein the plurality of execution behaviors are provided by a register of behaviors.

21. The method of claim 19, wherein the action is a step in a test case.

22. The method of claim 21, further comprising sending the selected execution behavior to the test case.

23. The method of claim 19, wherein the selecting step is based on at least one of a local weighting and a global weighting.

24. The method of claim 19, further comprising creating the selected execution behavior.

25. A method implemented on a computing device for selecting an execution behavior for executing an action, the selected execution behavior being one of a plurality of child execution behaviors of a parent execution behavior, the parent execution behavior more generally specifying the action to be executed and each child execution behavior of the parent execution behavior more specifically specifying the action to be executed or a portion thereof, the method comprising:
receiving the more generally specified action from the parent execution behavior;
reviewing data from the parent execution behavior regarding each child execution behavior thereof;
reviewing based on the data each child execution behavior of the parent execution behavior and the more specifically specified action thereof; and
selecting each of a predetermined series of the child execution behaviors such that the more specifically specified actions therein are sequentially executed.

26. The method of claim 25, wherein each execution behavior in the series of execution behaviors is selected in a predetermined order.

27. A computer-readable storage medium having stored thereon computer instructions executable by a computer for performing steps of:
receiving an action from a test case, the action being set forth within a parent execution behavior specified by the test case, the parent execution behavior having a plurality of child execution behaviors, the parent execution behavior more generally specifying the action and each child execution behavior of the parent execution behavior more specifically specifying the action or a portion thereof;
reviewing data from the parent execution behavior regarding each child execution behavior thereof;

reviewing based on the data each child execution behavior of the parent execution behavior and the more specifically specified action thereof; and selecting at least one of the child execution behaviors such that the more specifically specified action therein is executed.

28. The computer-readable storage medium of claim 27, further comprising computer-executable instructions for performing the step of selecting one execution behavior from the plurality of execution behaviors.

29. The computer-readable storage medium of claim 28, further comprising computer-executable instructions for performing the step of sending the selected execution behavior to the test case.

30. The computer-readable storage medium of claim 27, further comprising computer-executable instructions for performing the steps of selecting each of a predetermined series of execution behaviors.

31. The computer-readable storage medium of claim 30, wherein each execution behavior in the series of execution behaviors is selected in a predetermined order.

* * * * *